March 21, 1950     H. A. HOWARD     2,501,520
SECTION MODEL OF MEAT ANIMALS
Filed May 16, 1945

Inventor:
Harry A. Howard,
By Carl C. Batz
Attorney

Patented Mar. 21, 1950

2,501,520

UNITED STATES PATENT OFFICE 2,501,520

SECTION MODEL OF MEAT ANIMALS

Harry A. Howard, Chicago, Ill., assignor to Armour and Company, Chicago, Ill., a corporation of Illinois Application May 16, 1945, Serial No. 594,011

2 Claims. (Cl. 35—17)

This invention relates to a section model of a meat animal, and more particularly to a model having removable sections which illustrate the various meat cuts in the animal, the interior edible organs, etc.

An object of the invention is to provide a model which accurately represents a meat animal, with sections formed at least in one side thereof which permit the removal of the sections as meat cuts and for exposing the interior of the animal. A further object is to provide a structure wherein the legs and meat portions on one side of an animal can be removed in selected sections, together with means for supporting the animal so that no binding occurs in the removal of the sections and substantially no weight is carried by the sectioned side of the animal. A further object is to provide means whereby meat cuts are graphically set out upon removable sections of an animal, while at the same time supporting the sections independently of each other and by means sealing the spaces between the sections. Other specific objects and advantages will appear as the specification proceeds.

The invention is illustrated in a preferred embodiment, by the accompanying drawing, in which—

Figure 1:
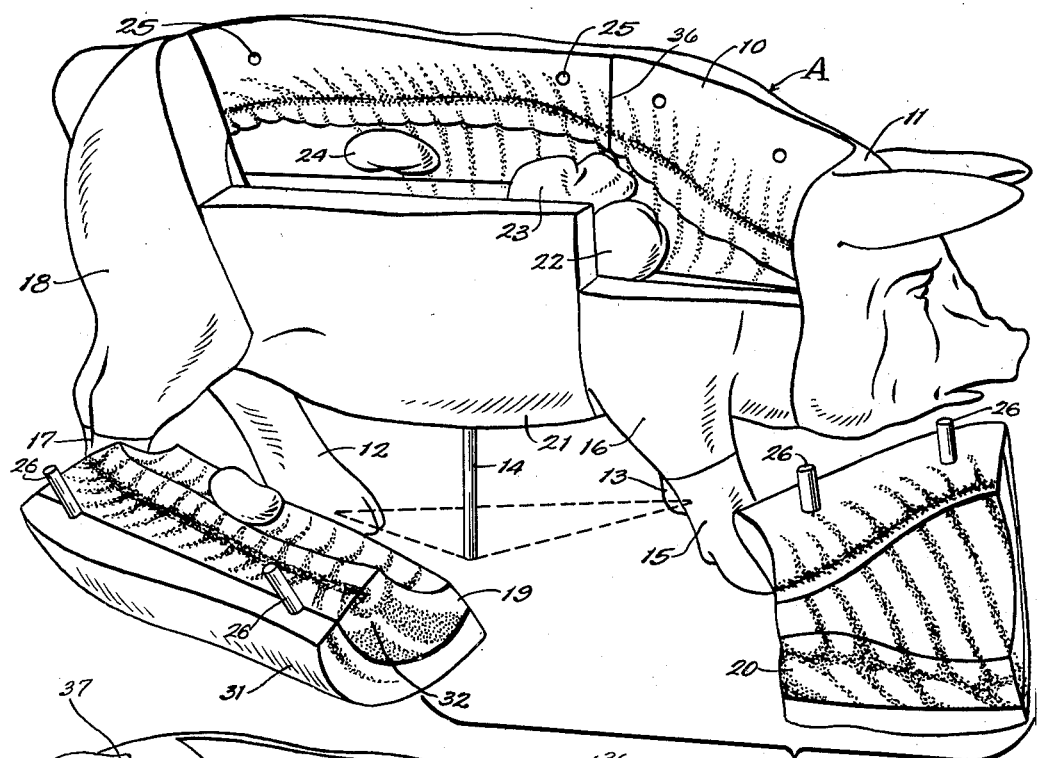
Figure 2:
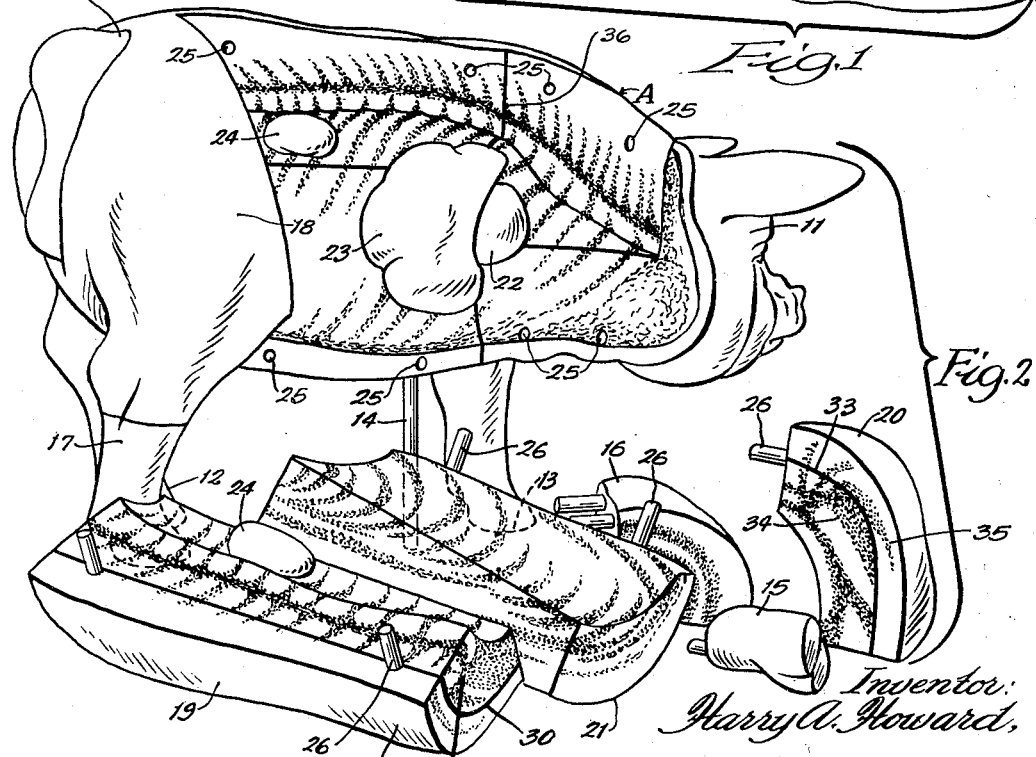

Figure 1 is a perspective view of a model of a hog with certain cuts removed from one side thereof; and Fig. 2, a perspective view from the rear side but showing a greater number of sections removed from the sectioned side of the model.

In the illustration given, A designates a model of a hog, formed of wood or any other suitable material or composition. I prefer to have a portion of the model left intact and to section one side thereof to permit the removal of the sections as desired. Associated with the intact portion of the model, I provide means which will support the entire structure independently of the sectioned side.

In the illustration given, a side of the model indicated by the numeral 10 is left intact. This includes, in the embodiment illustrated, the entire back side of the model illustrated, the head 11, and the legs 12 and 13. A peg 14 extends within a hole within the intact side 10 and rests on the platform or ground forwardly of the legs 12 and 13, thus providing a three-point support in the triangular arrangement indicated by dotted lines. This three-point support maintains the model in upright position irrespective of the removal of the sectioned legs and side.

One side of the model is sectioned so as to provide removable segments, each of which represents a particular meat cut from the hog. 15 and 16 represent sections of the front leg. Section 15 represents the hock and section 16 represents the picnic ham. These sections are secured together by means of two wooden dowels. 17 and 18 represent sections of the rear leg. Section 17 is the rear hock and section 18 is the ham. 19 designates the loin section. The heavy line 30 in this section illustrates the line of separation between the fat back 31 and the trimmed loin portion 32. 20 designates the shoulder and the line 33 illustrates the line of separation between the cala butt 34 and the clear plate 35. 21 designates the belly cut illustrated in Figures 1 and 2. Within the animal are removable model members indicating a heart, liver, and kidneys, the heart being indicated by the numeral 22, the liver by the numeral 23, and the kidneys by the numeral 24.

Any suitable means may be provided for supporting the various sections of meat and the internal edible organs upon the non-sectioned portion of the animal. However, I prefer to use a dowel arrangement such as that illustrated. In the illustration given, 25 indicates a series of horizontal recesses adapted to receive pegs 26 fixed to the removable sections whereby the sections will be supported upon the frame of the model independently of each other. With the horizontal arrangement of pegs and holes, one section may be withdrawn completely without disturbing or requiring the removal of the adjacent section. Similarly, the heart, liver, and kidney organs, 22, 23 and 24, are provided with pegs permitting their removal from the model when desired.

The meat in the interior of the animal exposed by the removal of the sections is graphically set out by a painting of a likeness of the meat on the interior surfaces. Similarly, I paint the contacting or adjacent surfaces of the removable sections so as to represent thereon a likeness of the meat exposed by the section. The three dimensions of each meat cut are therefore set out upon the removal of the section from the model, and it is the exact likeness of the particular meat cut obtained in practice at the packing plant. The painting of the contacting surfaces not only serves as a graphic representation of the meat cut, but also the paint film provides a sealing film which protects the interior of the model.

Heavy black lines on the interior of the model, as indicated by the numeral 36, designate lines of severance in forming the meat cuts already described and as illustrated by the removed parts shown in the lower portion of Fig. 2. Above the ham portion section 18, the numeral 37 indicates where the tail of the animal has been removed.

In the operation of the model, any one of the sections may be removed by drawing it laterally so as to disengage the pegs from the recesses 25. Since the entire sectioned side of the model is relieved of any supporting weight and since the pegs are horizontally guided within the holes 25, the removal of one section is accomplished without binding and without requiring the removal of another section. Upon removal of a section, the pegs 26, which are embedded in the meat cuts, serve as handles to support the cut for examination and without bringing the fingers of the person into contact with any of the painted surfaces of the model during the turning and examining of the cut.

The entire sectioned side of the model may be removed, including both legs, and then in replacing the sections, any section may be restored to position in any desired order. By replacing sections one by one in a different sequence, the animal can be studied and a graphic picture of the various meat cuts, their locations, and characteristics obtained.

While in the foregoing specification, I have illustrated a hog as a means of setting out the invention, it will be understand that the invention includes any other meat animal, and further that the details given in the specific model may be varied widely by those skilled in the art without departing from the spirit of my invention.

I claim:

1. A section model of a four legged meat animal in which one side of the model, together with the two legs therebelow is substantially intact and in which one side is sectioned and removable in sections that represent different meat cuts, said sections including the two legs of the sectioned side, and means cooperating with the two non-sectioned legs of the animal for supporting all of the weight of the model.

2. A section model of a four legged meat animal having one side thereof substantially intact and having one side sectioned and removable in sections that represent different meat cuts, said intact side and said removable sections being provided with cooperating means for supporting the sections independently of each other on said intact side, said sectioned side including the two legs thereof, and a member anchored to the non-sectioned side of the model and extending midway between and laterally of said sectioned legs to provide a three-point support with the non-sectioned legs of the animal for supporting all of the weight of the model.

HARRY A. HOWARD.

REFERENCES CITED

The following references are of record in the file of this patent:

UNITED STATES PATENTS

| Number | Name | Date |
|---|---|---|
| 388,593 | Smith | Aug. 28, 1888 |
| 411,816 | Lee | Oct. 1, 1889 |
| 1,403,896 | Delaplaine | Jan. 17, 1922 |
| 1,536,125 | Moorman | May 5, 1925 |
| 1,868,209 | Kapernick | July 19, 1932 |

FOREIGN PATENTS

| Number | Country | Date |
|---|---|---|
| 699,055 | Germany | Nov. 21, 1940 |

OTHER REFERENCES

Clay-Adams Co. Catalogue No. 26 (pages 19–23).